United States Patent
Pande et al.

(10) Patent No.: US 12,489,753 B2
(45) Date of Patent: Dec. 2, 2025

(54) FINE-GRAINED SEGMENTATION AND TRAFFIC ISOLATION IN DATA CONFIDENCE FABRIC NETWORKS

(71) Applicant: Dell Products L.P., Round Rock, TX (US)

(72) Inventors: Pankaj Pande, Carlingford (AU); Stephen J. Todd, North Andover, MA (US)

(73) Assignee: Dell Products L.P., Round Rock, TX (US)

( * ) Notice: Subject to any disclaimer, the term of this patent is extended or adjusted under 35 U.S.C. 154(b) by 328 days.

(21) Appl. No.: 18/188,832

(22) Filed: Mar. 23, 2023

(65) Prior Publication Data

US 2024/0323187 A1   Sep. 26, 2024

(51) Int. Cl.
*H04L 29/00* (2006.01)
*H04L 9/40* (2022.01)
*H04L 12/46* (2006.01)

(52) U.S. Cl.
CPC .......... *H04L 63/10* (2013.01); *H04L 12/4641* (2013.01)

(58) Field of Classification Search
CPC ...... H04L 63/10; H04L 12/4641; H04L 63/20
See application file for complete search history.

(56) References Cited

U.S. PATENT DOCUMENTS

| | | | |
|---|---|---|---|
| 9,124,635 B2* | 9/2015 | Robinson | H04L 63/20 |
| 10,419,483 B1* | 9/2019 | Allen | G06F 9/45516 |
| 10,960,838 B2* | 3/2021 | Sobhany | B60N 2/0025 |
| 11,070,579 B1* | 7/2021 | Kiernan | G06F 21/552 |
| 11,843,624 B1* | 12/2023 | Estep | G06N 3/09 |
| 2007/0005417 A1* | 1/2007 | Desikan | G06Q 30/0241 705/14.49 |
| 2012/0011559 A1* | 1/2012 | Miettinen | G06F 21/31 726/1 |
| 2012/0185910 A1* | 7/2012 | Miettinen | H04L 63/107 726/1 |
| 2016/0180068 A1* | 6/2016 | Das | H04L 63/0861 726/7 |
| 2019/0038902 A1* | 2/2019 | Kaemmerer | A61N 1/36139 |
| 2019/0163777 A1* | 5/2019 | Bhide | G06F 16/122 |
| 2019/0392328 A1* | 12/2019 | Gil Bulacio | H04L 63/16 |
| 2020/0106803 A1* | 4/2020 | Schwartz | H04W 12/086 |
| 2021/0242508 A1* | 8/2021 | Millen | H04L 63/123 |
| 2022/0172081 A1* | 6/2022 | Zweig | G06N 5/04 |
| 2023/0083633 A1* | 3/2023 | Desai | G16H 10/60 726/19 |
| 2023/0403301 A1* | 12/2023 | Fong | H04L 63/20 |
| 2024/0012912 A1* | 1/2024 | Zhang | H04L 41/16 |
| 2024/0013067 A1* | 1/2024 | Azarafrooz | G06F 21/602 |
| 2024/0155004 A1* | 5/2024 | Voskamp | H04L 63/20 |
| 2024/0323187 A1* | 9/2024 | Pande | H04L 63/20 |

* cited by examiner

*Primary Examiner* — Don G Zhao
(74) *Attorney, Agent, or Firm* — Workman Nydegger

(57) ABSTRACT

A data confidence fabric allows data to be associated with confidence scores that reflect how the data may be trusted. Sensors or other devices may generate data. Confidence scores for the sensors are determined and the data confidence fabric determines a security strategy for the data based on the confidence score of the sensor generating the data. Confidence information associated with the data may include an annotation reflecting the security strategy that was applied and which may impact the confidence score of the data.

18 Claims, 6 Drawing Sheets

FINE-GRAINED SEGMENTATION AND TRAFFIC ISOLATION IN DATA CONFIDENCE FABRIC NETWORKS

FIELD OF THE INVENTION

Embodiments of the present invention generally relate to computing networks including data confidence fabric networks. More particularly, at least some embodiments of the invention relate to systems, hardware, software, computer-readable media, and methods for segmenting and isolating traffic flowing in or to a data confidence fabric and generating confidence scores that reflect traffic segmentation and isolation.

BACKGROUND

Computing and other electronic devices come in a variety of types and form factors and have varying capabilities. Many of these devices generate data that may be used by various applications. There is often a question, however, about the value of the data or how much the data should be trusted. The ability to trust data may depend on the manner in which the data is generated and subsequently transmitted to an application. Further, the security of a computing system may also be impacted by the manner in which data is ingested into the computing network. At the same time, applications benefit from using data in which there is high confidence. Transmitting data to a computing network without a security strategy may open the computing network to an attack and reduces confidence in the data.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Figure 1:
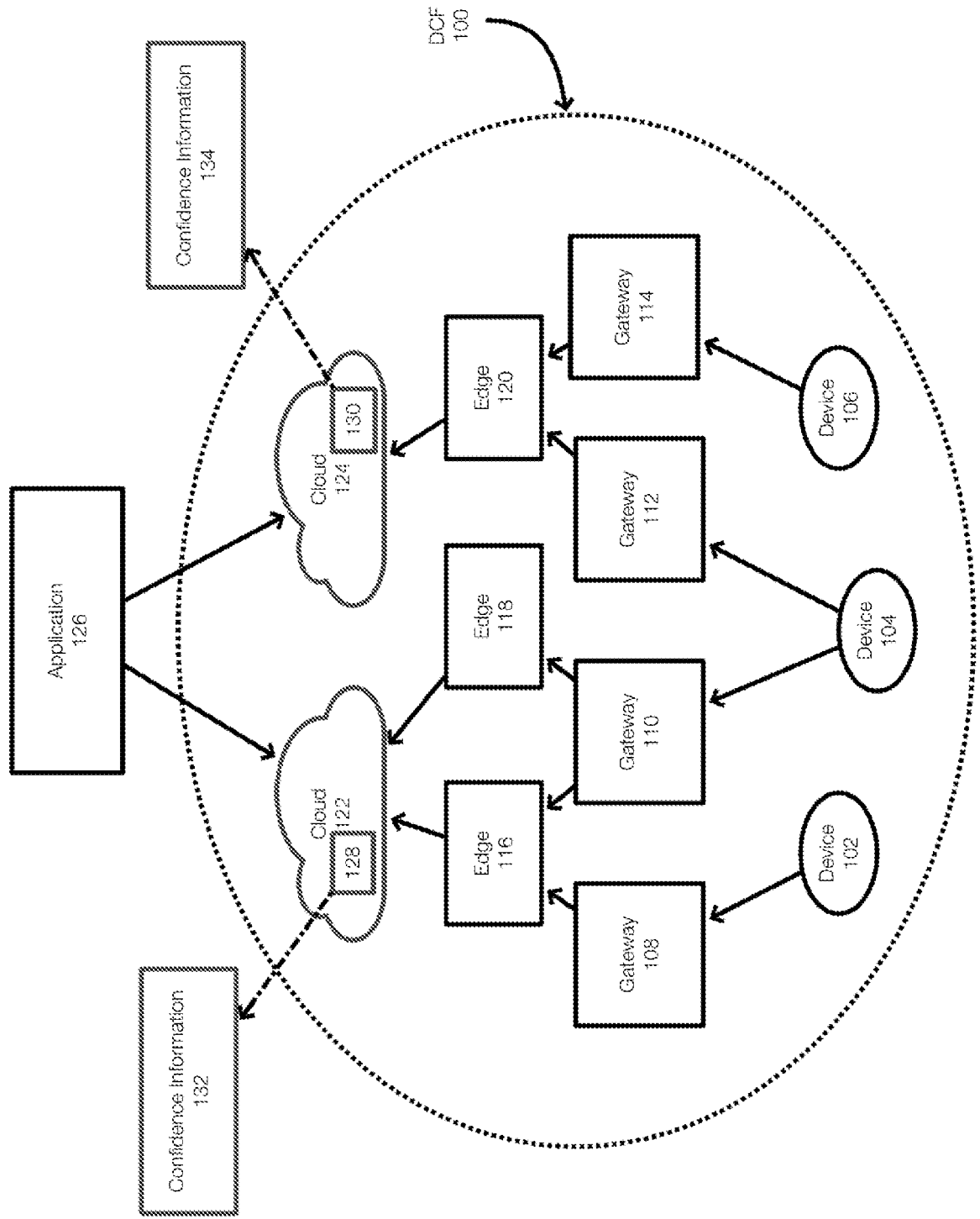
FIG. 1 discloses aspects of a data confidence fabric.

Embodiments of the present invention generally relate to computing systems or ecosystems such as data confidence fabrics (DCFs). In one example, a DCF is a system or network of hardware (computers, servers, routers, network interface cards, storage including immutable storage and/or other hardware) that is provisioned (e.g., with software, services) to score or rank data that may be ingested into and/or transmitted through the DCF. The data ingested into the DCF can be made available to applications, which may also be part of the DCF. The applications can leverage the confidence scores of the data.

A DCF is generally configured to add or associate confidence information to data. Confidence information can take various forms including a confidence score and associated metadata. The confidence information can be added from a hardware perspective and/or a software perspective.

Embodiments of the invention relate to DCF configurations in which data ingested into the DCF is segmented, isolated, and/or scored. Further, the segmentation and/or isolation applied to the data may be based on a confidence score associated with a source of the data. Embodiments of the invention further relate to generating confidence information based on the manner in which data is received into the DCF. For example, data transmitted using zero-trust security may be given a confidence score that is higher than data ingested with no network security. Embodiments relate to measuring or determining confidence based on the presence of absence of network segmentation techniques.

A DCF, by way of example only, may be an architecture and set of services that allow data to be ingested and used by applications. The DCF may include trust insertion technologies (hardware and/or software) that are applied to the data as the data flows through the DCF. Each time a trust insertion technology is applied, an annotation may be made in a ledger or other structure and the confidence score may be changed. Thus, the confidence score of data provides a view into the trustworthiness of the data to an application.

A DCF may include various interconnected hardware environments (e.g., nodes). These nodes may have varying hardware capabilities that are examples of trust insertion technologies or hardware-assisted trust insertion technologies. The hardware is configured such that, as data flows from data sources to storage or to applications in a DCF system, scores can be attached or associated with the data. As the data is handled or processed by various forms of trust insertion technologies, the overall score or ranking (e.g., a confidence or trustworthiness score) of the data may change. The data scored or ranked in the DCF system may be stored in various locations, such as a data lake, in a datacenter, Public Cloud data storage service, or the like. The confidence information, which may include a confidence score or rank, is made available to one or more applications or other clients or users. The confidence information may include, in addition to a confidence score and/or rank, tables, audit information, and the like.

Confidence scores, which may be determined from hardware aspects and/or software aspects of a DCF, allow an application to explore or exploit the data for potential analysis or consumption. The confidence score or rank of the data allows an application to understand or account for the trustworthiness of the data. For example, the confidence score of the data may have an impact on whether the data is actually used by the application. An application may require a minimum confidence score or have other requirements related to the confidence score.

Embodiments of the invention, by way of example, provide a DCF system or configuration that provides or establishes trusted and auditable node connectivity within the DCF, and trusted and auditable interactions with other DCFs. A DCF is able to give or associate data with scores from individual trust insertion technologies that can be combined in multiple ways to determine a final score or rank that relates to the trustworthiness of the data. The scores provided from a hardware perspective can be maintained separately from confidence scores from a software perspective. The scores can also be combined into an overall score.

FIG. 1 illustrates an example of a data confidence fabric network (DCF). The DCF 100 includes varies computing and hardware components, connections, and environments. The DCF 100 is configured to add confidence information including confidence scores to data or packets flowing in the DCF 100.

FIG. 1 illustrates examples of data routes or paths in the DCF 100. Each route may be an example of a graph. In FIG. 1, data generated by devices 102, 104, and 106 may flow through multiple levels or multiple hardware environments such as gateways 108, 110, 112, and 114, edges 116, 118, 120, and clouds 122 and 124. In one example, the data generated by the devices 102, 104, and 106 may be stored in the clouds 122 and 124.

As the data 128 and the data 130 flow through the DCF 100, the DCF 100 may add confidence information to the data. After flowing through the DCF 100, the data 128 (which may have been generated by one of the devices 102, 104, and/or 106) is stored in the cloud 122 and made available to an application 126. Similarly, the data 130 may be made available to the application 126. The data 128 is associated with confidence information 132 and the data 130 is associated with confidence information 134. The confidence information 132 and 134 may include confidence scores, provenance data, audit trails/logs, data graphs, applied trust insertion technologies, or the like.

Data flowing through a DCF is typically more valuable and useful to an application at least because the confidence scores or ranks of DCF annotated data allow the application to decide how or whether to trust and/or use the associated data.

Figure 2:
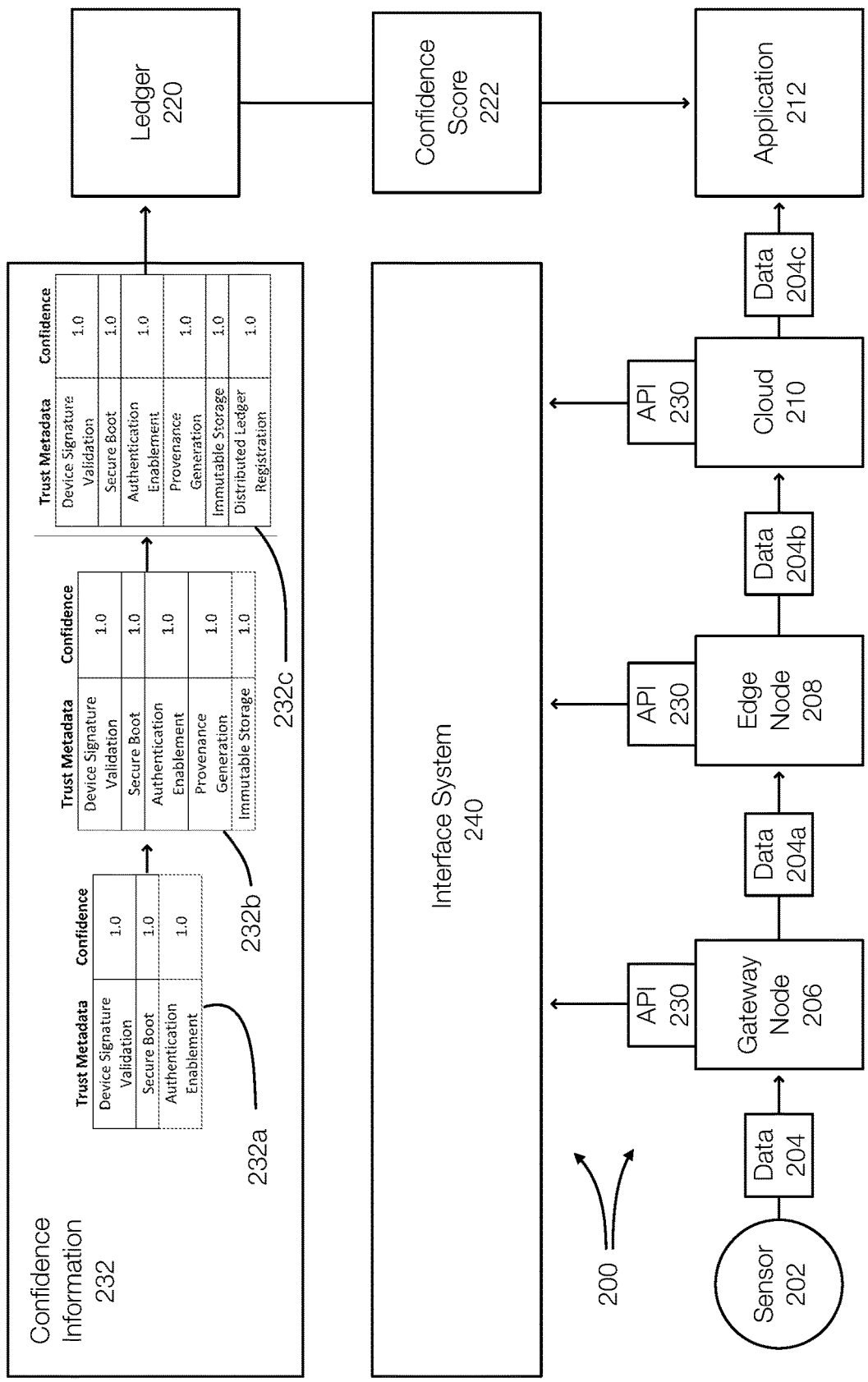
FIG. 2 discloses additional aspects of a data confidence fabric that is configured to select security configurations based in part on hardware confidence scores.

FIG. 2 discloses additional aspects of a data confidence fabric network. FIG. 2 illustrates a DCF 200, which is an example of the DCF 100. In the DCF 200, data 204 is generated by a sensor 202 (or other devices such as user devices) and is ingested into the DCF 200. The data 204 may be received at a gateway node 206, which interfaces with an interface system 240 of the DCF 200 to annotate the data 204 with confidence information.

As illustrated in FIG. 2, confidence information 232 is generated and accompanies the data 204 as the data 204 is routed in the DCF 200. At the gateway node 206, for example, the data 204 is annotated with confidence information 232a, which relates to trust insertion technologies such as a device signature validation, a secure boot, and an authentication enablement. Each of these trust insertion technologies, in this example, are performed and add a confidence score that is reflected in the confidence information 232a. More specifically, the gateway node 206 may access an interface system 240 using an application programming interface (API) 230 to record the confidence information 232a.

Next, the data 204a (which is the annotated data 204 after passing through the gateway node 206) is routed to an edge node 208 and additional confidence information is added as reflected in the confidence information 232b. Thus, the data 204a arrives at the edge node 208 and is already associated with the confidence information 232a. The edge node 208 may add or apply additional trust insertion technologies such as provenance generation and immutable storage. These trust insertion technologies allows the confidence information to be augmented as illustrated by the confidence information 232b. Thus, the data 204b leaving the edge node 208 is associated with the confidence information 232b.

Next, the data 204b arrives at the cloud 210 and additional confidence information is added as illustrated by the confidence information 232c. Thus, the cloud 210 may apply or use a trust insertion technology such as distributed ledger registration and the confidence information 232 is updated as shown by the confidence information 232c.

In one example, the confidence information 232 is stored in a ledger 220. As a result, the confidence information 232 is secure and can be accessed by an application 212. In this example, the data 204 arrives at the application 212 as the annotated data 204c, which is associated with the confidence information 232c and with a confidence score of, in this example, 6.0. The application 212 thus has insight into the trustworthiness of the data 204 generated at the sensor 202 and is able to evaluate the confidence information 232 in addition to just the confidence score.

The confidence score can be generated in different ways. The various trust insertion technologies may be weighted or have different scores. For example, the DCF 200 may be associated with a maximum confidence score (e.g., 10, 100, or other metric). Alternatively, a maximum confidence score may not be present. If the data 204 had followed a different route in the DCF 200, the confidence score may be different. For example, other nodes may have trust insertion technologies that could have increased the confidence score of the data 204. Different routes may also result in lower confidence scores.

Embodiments of the invention relate to aspects of routing data including ingesting data from sensors or other sources. Embodiments of the invention allow the DCF to determine a security strategy to be applied to the sensors that generate data. The security strategy or protocol applied to a particular sensor may depend on a confidence score of that sensor or of the hardware.

Although FIGS. 1 and 2 illustrate examples of DCFs, a DCF can be implemented in various environments that may or may not include cloud components. For example, a retail environment or warehouse environment may implement a DCF locally.

Figure 3A:
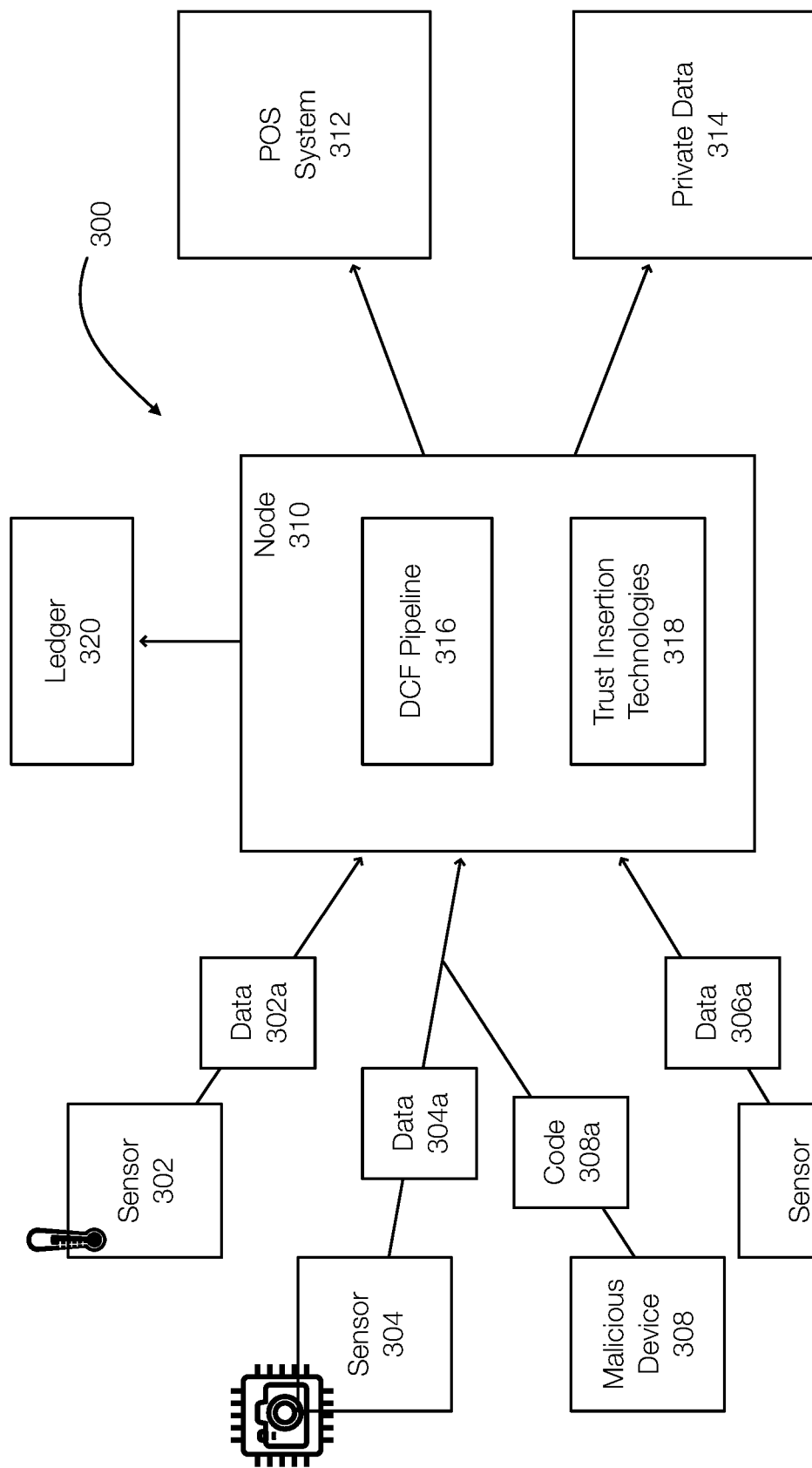
FIG. 3A discloses aspects of receiving data in a data confidence fabric.

FIG. 3A discloses aspects of an environment in which a DCF is implemented and illustrates data segmentation and data isolation in the context of confidence information and confidence scores. FIG. 3A illustrates a node 310, which may be part of a computing network such as a DCF. The node 310 may be part of a network in a retail environment, for example, which may have other sub subsystems such as a point of sale (POS) system 312, private data 314 (e.g., credit card numbers and other personal data). Other systems may be included in the DCF 300.

In this example, the DCF 300 may ingest or receive data from sensors 302, 304, and 306. The sensor 302 may be a thermometer, the sensor 304 may be a video camera, and the sensor 306 may be or represent an HVAC system. The data 302a, 304a, and 306a may be received into the node 310. The DCF pipeline 316 may apply trust insertion technologies to the data 302a, 304a, and 306a and store annotations related to the trust insertion technologies, including confidence information or confidence scores, in a ledger 320. The data and associated confidence information may be used by applications. For example, the data 302a from a thermometer and data 306a from an HVAC system may be used by an application to regulate heating or air conditioning requirements. The data 304a from a camera may be used by security applications or the like.

In FIG. 3A, the data 302a, 304a, and 306a are all transmitted over the same channel (e.g., the same network). As a result, the data 302a, 304a, and 306a and their sources (sensors 302, 304, and 306) are not segmented or isolated from each other. This may complicate the ability to identify a source of a threat to the DCF 300.

A malicious user may use a malicious device 308 to inject data or code 308a that is then ingested into the DCF 300. The code 308a may ultimately allow a malicious user to access the POS system 312, the private data 314, actuate sensors in the environment and cause other damage. In another example, a malicious user may simply connect to the cable attached to the camera and attempt to access systems of the environment.

Figure 3B:
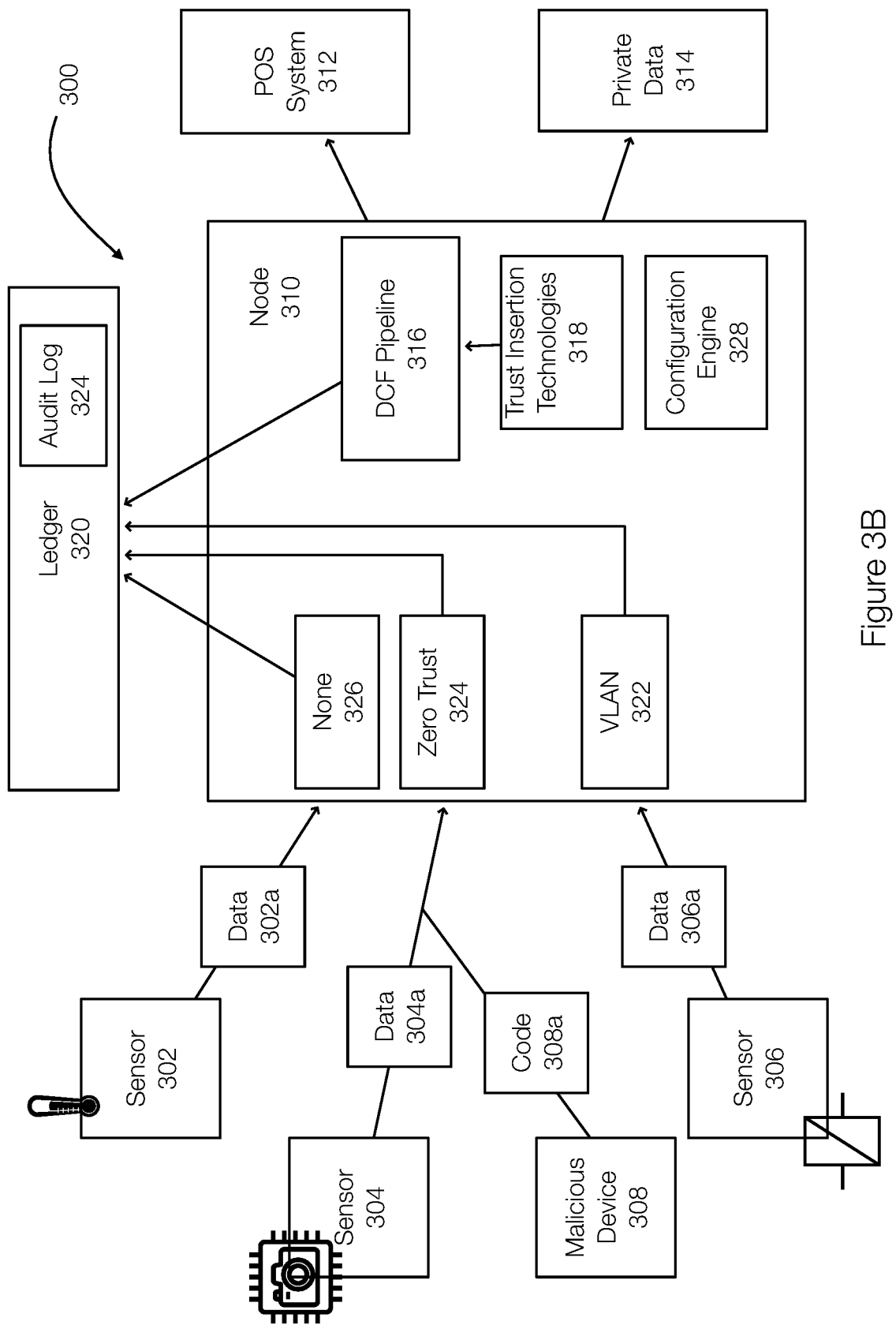
FIG. 3B discloses additional aspects of segmenting and isolating data based on hardware confidence scores.

FIG. 3B illustrates an example of a DCF that includes edge security frameworks (security strategies) and that is configured to generate confidence information for data ingested using these security strategies and or confidence information for the sensors generating data. FIG. 3B illustrates that the node 310 is configured with security strategies such as zero trust 324 and a VLAN (Virtual Local Area Network) 322 architecture. Data may be ingested or received without a security strategy (e.g., none 326). These security strategies allow data from specific sensors or from types of sensors or categories of sensors or other devices to be segmented and isolated from data of other sensors. This may allow threats to be identified more easily.

Implementing strategies such as a zero trust 324 strategy enables fine-grained segmentation and isolation. The zero trust 324 strategy or architecture can prevent an IoT device or sensor 304, (a video camera) from being used to gain access to systems such as the POS system 312 or private data 314. The zero trust 324 strategy allows an entity or a network isolate potential security threats by device type, role, and application all enable compliance, by way of example, with PCI (Payment Card Industry), HIPAA (Health Insurance Portability and Accountability Act), and SOX (Sarbanes Oxley) requirements.

The DCF Pipeline 316 may be configured to annotate data with annotations that describes the security strategy (e.g., type of segmentation and/or isolation) that was applied to data (e.g., zero trust 324 and VLAN 322). In some examples, the type of security strategy may depend on the capabilities of the sensors from which data is received.

More specifically, the DFC pipeline 316 (or other DCF component) may be configured to determine the type of segmentation to be deployed or used with the sensors 302, 304, and 306. For example, the DCF 300 may include or provide a configuration engine 328. The configuration engine 328 may be configured to collect information about the sensors and/or their capabilities. The configuration engine 328 may collect, from the sensor 304 (a video camera) and from other sensors, a vendor name, firmware version, manufacturing date, software version, or the like. The information may be obtained from another source. Using this information, the configuration engine 328 can assign or generate a hardware confidence score that reflects confidence in the hardware of the relevant sensor.

For example, the sensor 302 may only have the ability to send measurement values. The lack of computing resources suggests less risk and the configuration engine 328 may determine that no security strategy is required (none 326). The sensor 302 may continue to transmit data in raw form to the DCF 300.

The sensor 304, which may be a hardware video camera, may have more computational power, controllers, processors or the like. Further the connection of the sensor 304 to the DCF 300 could also be compromised. Thus, the confidence score of the 304 may be below a threshold score and require that data be received using a security strategy.

More specifically, the confidence score assigned to the sensor 304 may be low due to the risk. Based on the confidence score, the configuration engine 328 may require communications with the sensor 304 to be performed using a security strategy such as zero trust 324. Using zero trust 324 with the sensor 304 can improve the confidence in the data being received from the sensor 304. The malicious device 308 would not be able to satisfy the zero trust requirements. Further, data from the sensor 304 would be segmented and isolated. In this example, the sensor 304 has the ability to engage in zero trust communications or handshakes.

The DCF pipeline 316 may also annotate data from the sensors to reflect the security performed on the data, which may improve the overall confidence score of the data.

Further, the DCF pipeline 316 or configuration engine 328 may enable security-centric confidence scores that can be calculated based on the annotations. Also, the ledger 320 may include an audit log 324 of security measures or strategies that were in place for any data flowing through the DCF 300.

Embodiments of the invention allow the DCF to determine which security strategy or framework to use for receiving data. This decision may be based on security strategies available. Hardware confidence scores are determined such that the DCF can determine security strategies for the sensors at nodes in the DCF. In the case of an edge or gateway node, this may include requiring/recommending zero trust segmentation for first sensors, VLAN segmentation for second sensors, and no segmentation for third sensors. Other segmentation processes may be performed.

Figure 4:
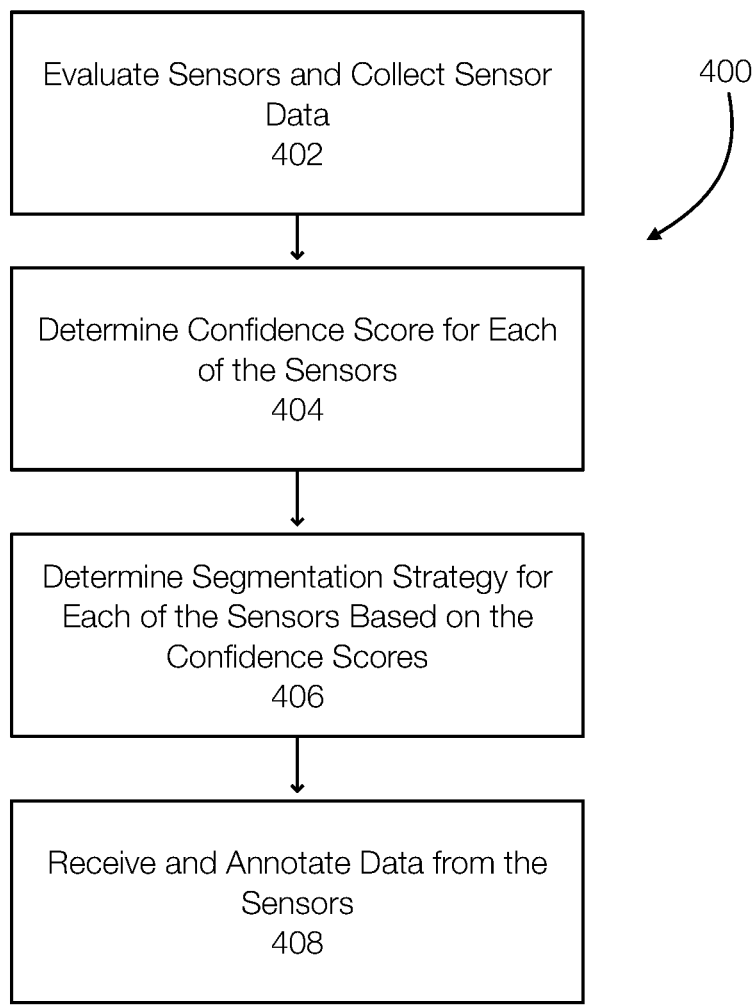
FIG. 4 discloses aspects of applying a security strategy to sensors or other nodes from which data is received.

FIG. 4 discloses aspects of setting security strategies for data sources in a data confidence fabric. In the method 400, the information about the sensors (or other data sources) may be collected and the sensors are evaluated 402. The evaluation is performed in order to determine 404 a confidence score for each of the sensors. The confidence score may depend on information or characteristics such as the computational resources of the sensor, the manufacturer, the firmware/software versions, sensor model, and/or the like.

For example, more recently manufactured sensors may receive a higher confidence score than an older sensor. Sensors whose firmware/software are up to date may receive a higher confidence score. Sensors that have security capabilities (e.g., zero trust capabilities, encryption capabilities) may receive a higher confidence score. The absence of computing capabilities may contribute to the confidence score. Each of the factors may contribute to an overall hardware confidence score.

Once the confidence scores of the sensors are determined, the DCF can require/recommend 406 a segmentation strategy (VLAN, Zero Trust, None) for each of the sensors. Data received from the sensors is then received and annotated 408. The confidence score assigned to data may reflect the confidence score of the hardware. Thus, the confidence score for data received at a node may include the confidence score of the sensor, a confidence score of the security strategy, and/or confidence scores of trust insertion technologies applied to the data at the node. As previously stated, an audit log may detail the security measures or strategies that were performed for any data flowing through the DCF.

It is noted that embodiments of the invention, whether claimed or not, cannot be performed, practically or otherwise, in the mind of a human. Accordingly, nothing herein should be construed as teaching or suggesting that any aspect of any embodiment of the invention could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods processes, and operations, are defined as being computer-implemented.

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, data network operations, routing operations, forwarding operations, segmentation operations, confidence score determination operations, confidence information generation/storing operations, or the like. More generally, the scope of the invention embraces any operating environment in which the disclosed concepts may be useful.

At least some embodiments of the invention provide for the implementation of the disclosed functionality in existing backup platforms, examples of which include the Dell-EMC NetWorker and Avamar platforms and associated backup software, and storage environments such as the Dell-EMC DataDomain storage environment. In general, however, the scope of the invention is not limited to any particular data backup platform or data storage environment.

New and/or modified data collected and/or generated in connection with some embodiments, may be stored in a data protection environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter or other environment.

Example cloud computing environments, which may or may not be public, include storage environments that may provide services/functions for one or more clients. Another example of a cloud computing environment is one in which processing, data protection, and other, services may be performed on behalf of one or more clients. Some example cloud computing environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment.

In addition to the cloud environment, the operating environment may also include one or more clients that are capable of collecting, modifying, and creating, data. As such, a particular client may employ, or otherwise be associated with, one or more instances of each of one or more applications that perform such operations with respect to data. Such clients may comprise physical machines, containers, or virtual machines (VMs).

Particularly, devices in the operating environment may take the form of software, physical machines, containers, or VMs, or any combination of these, though no particular device implementation or configuration is required for any embodiment. Similarly, data system components such as databases, storage servers, storage volumes (LUNs), storage disks, servers, and the like, for example, may likewise take the form of software, physical machines, containers, or virtual machines (VMs), though no particular component implementation is required for any embodiment.

As used herein, the term 'data' is intended to be broad in scope. Thus, that term embraces, by way of example and not limitation, data produced in computing environments, by far edge nodes, sensors, user devices, or the like. Data may include time series data and may have various formats and structures.

It is noted that any operation(s) of any of methods discloses herein may be performed in response to, as a result of, and/or, based upon, the performance of any preceding operation(s). Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited.

Following are some further example embodiments of the invention. These are presented only by way of example and are not intended to limit the scope of the invention in any way.

Embodiment 1. A method comprising: determining characteristics of sensors that generate data received into a data confidence fabric, determining a confidence score for each of the sensors, determining, by the data confidence fabric, a security strategy for each of the sensors based on the corresponding confidence score and available security strategies, and receiving data from the sensors, wherein the security strategy applied to the received data is annotated with confidence information associated with the data.

Embodiment 2. The method of embodiment 1, wherein the characteristics include manufacturing data, firmware version, software version, model, and/or computing capabilities.

Embodiment 3. The method of embodiment 1 and/or 2, wherein determining the confidence score for a particular sensor includes determining whether the particular sensor is a most recently manufactured sensor, whether firmware of the particular sensor is up-to-date, whether software of the particular sensor is up-to-date, and/or which security strategies are supported by the particular sensor.

Embodiment 4. The method of embodiment 1, 2, and/or 3, wherein the security strategy is zero trust, virtual local area network (VLAN) or none.

Embodiment 5. The method of embodiment 1, 2, 3, and/or 4, further comprising recording the confidence information associated with the data in a ledger.

Embodiment 6. The method of embodiment 1, 2, 3, 4, and/or 5, wherein the ledger comprises an audit log that identifies security strategies operating for each data flowing through the data confidence fabric.

Embodiment 7. The method of embodiment 1, 2, 3, 4, 5, and/or 6, wherein the security strategy is determined by the data confidence fabric when the confidence score of the sensor is below a threshold confidence score.

Embodiment 8. The method of embodiment 1, 2, 3, 4, 5, 6, and/or 7, further comprising segmenting data received from the sensors.

Embodiment 9. The method of embodiment 1, 2, 3, 4, 5, 6, 7, and/or 8, wherein the security strategies segregate and isolate the data received from the sensors.

Embodiment 10. The method of embodiment 1, 2, 3, 4, 5, 6, 7, 8, and/or 9, further comprising identifying and segmenting the sensors and their data such that the data from a first sensor is isolated from data of other sensors.

Embodiment 11 A system, comprising hardware and/or software, operable to perform any of the operations, methods, or processes, or any portion of any of these, disclosed herein.

Embodiment 12 A non-transitory storage medium having stored therein instructions that are executable by one or more hardware processors to perform operations comprising the operations of any one or more of embodiments 1-10.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general-purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term module, component, engine, agent, client, or the like may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 5:
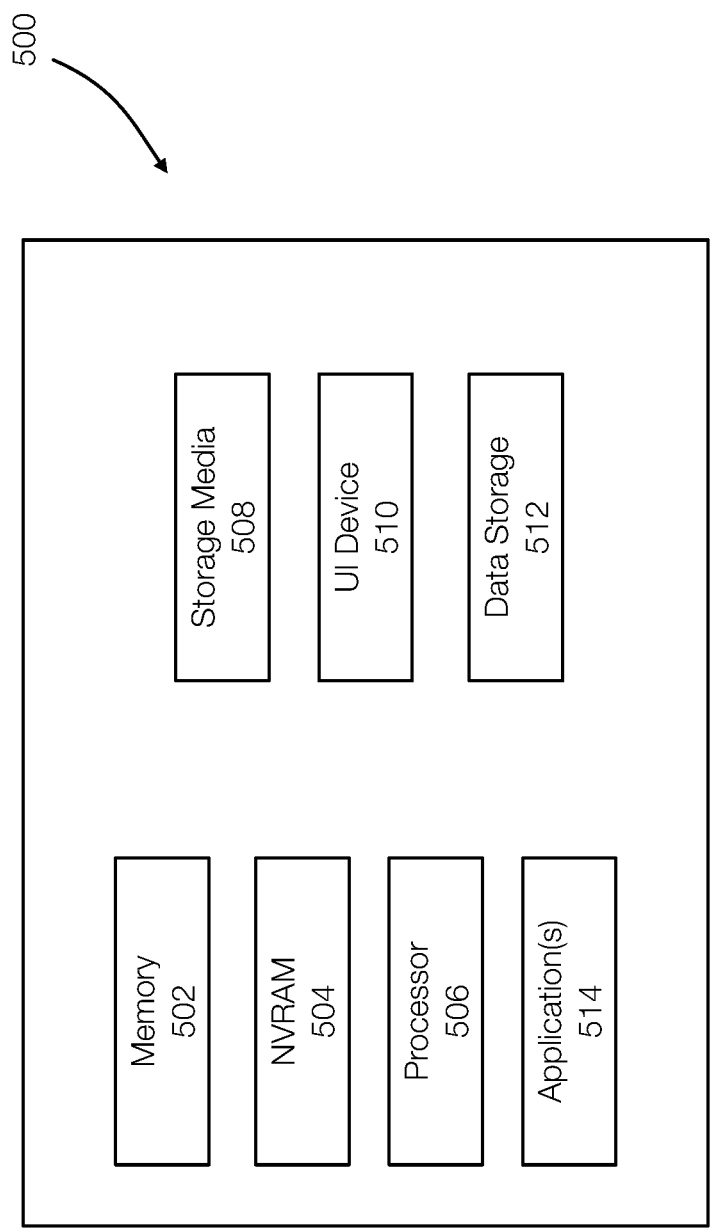
FIG. 5 discloses aspects of a computing device, system, or entity.

With reference briefly now to FIG. 5, any one or more of the entities disclosed, or implied, by the Figures, and/or elsewhere herein, may take the form of, or include, or be implemented on, or hosted by, a physical computing device, one example of which is denoted at 500. As well, where any of the aforementioned elements comprise or consist of a virtual machine (VM), that VM may constitute a virtualization of any combination of the physical components disclosed in FIG. 5.

In the example of FIG. 5, the physical computing device 500 includes a memory 502 which may include one, some, or all, of random access memory (RAM), non-volatile memory (NVM) 504 such as NVRAM for example, read-only memory (ROM), and persistent memory, one or more hardware processors 506, non-transitory storage media 508, UI device 510, and data storage 512. One or more of the memory components 502 of the physical computing device 500 may take the form of solid state device (SSD) storage. As well, one or more applications 514 may be provided that comprise instructions executable by one or more hardware processors 506 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:

determining characteristics of sensors that generate data received into a data confidence fabric;

determining a confidence score for each of the sensors;

determining, by the data confidence fabric, a security strategy for each of the sensors based on the corresponding confidence score and available security strategies; and receiving the data generated by the sensors, wherein the received data is annotated with confidence information that reflects the security strategy and the confidence scores of the sensors; and recording the confidence information associated with the data in a ledger.

2. The method of claim 1, wherein the characteristics include manufacturing data, firmware version, software version, model, and/or computing capabilities.

3. The method of claim 1, wherein determining the confidence score for a particular sensor includes determining whether the particular sensor is a most recently manufactured sensor, whether firmware of the particular sensor is up-to-date, whether software of the particular sensor is up-to-date, and/or which security strategies are supported by the particular sensor.

4. The method of claim 1, wherein the security strategy is zero trust, virtual local area network (VLAN) or none.

5. The method of claim 1, wherein the ledger comprises an audit log that identifies security strategies operating for each data flowing through the data confidence fabric.

6. The method of claim 1, wherein the security strategy for a particular sensor included in the sensors is determined by the data confidence fabric when a particular confidence score of the particular sensor is below a threshold confidence score.

7. The method of claim 1, further comprising segmenting data received from the sensors.

8. The method of claim 7, wherein the security strategies segregate and isolate the data received from the sensors.

9. The method of claim 1, further comprising identifying and segmenting the sensors and their data such that the data from a first sensor is isolated from data of other sensors.

10. A non-transitory storage medium having stored therein instructions that are executable by one or more hardware processors to perform operations comprising:

determining characteristics of sensors that generate data received into a data confidence fabric;

determining a confidence score for each of the sensors;

determining, by the data confidence fabric, a security strategy for each of the sensors based on the corresponding confidence score and available security strategies; and receiving the data generated by the sensors, wherein the received data is annotated with confidence information that reflects security strategy and the confidence scores of the sensors; and recording the confidence information associated with the data in a ledger.

11. The non-transitory storage medium of claim 10, wherein the characteristics include manufacturing data, firmware version, software version, model, and/or computing capabilities.

12. The non-transitory storage medium of claim 10, wherein determining the confidence score for a particular sensor includes determining whether the particular sensor is a most recently manufactured sensor, whether firmware of the particular sensor is up-to-date, whether software of the particular sensor is up-to-date, and/or which security strategies are supported by the particular sensor.

13. The non-transitory storage medium of claim 10, wherein the security strategy is zero trust, virtual local area network (VLAN) or none.

14. The non-transitory storage medium of claim 10, wherein the ledger comprises an audit log that identifies security strategies operating for each data flowing through the data confidence fabric.

15. The non-transitory storage medium of claim 10, wherein the security strategy for a particular sensor included in the sensors is determined by the data confidence fabric when a particular confidence score of the particular sensor is below a threshold confidence score.

16. The non-transitory storage medium of claim 10, further comprising segmenting data received from the sensors.

17. The non-transitory storage medium of claim 16, wherein the security strategies segregate and isolate the data received from the sensors.

18. The non-transitory storage medium of claim 10, further comprising identifying and segmenting the sensors and their data such that the data from a first sensor is isolated from data of other sensors.

* * * * *